United States Patent [19]

Vogel

[11] 3,728,921
[45] Apr. 24, 1973

[54] APPARATUS FOR CUTTING A WEB INTO SHEETS AND POSITIONING THE SHEETS

[75] Inventor: Walter H. Vogel, Plymouth, Wis.

[73] Assignee: Hayseen Manufacturing Company, Sheboygan, Wis.

[22] Filed: Apr. 1, 1971

[21] Appl. No.: 130,379

[52] U.S. Cl. .................83/151, 53/389, 83/110, 83/152, 83/452
[51] Int. Cl. ....B65b 41/04, B65b 41/18, B65b 61/06
[58] Field of Search..................83/110, 152, 154, 83/94, 452, 155; 53/389; 271/45

[56] References Cited

UNITED STATES PATENTS

| 3,355,166 | 11/1967 | Plumb | 53/389 X |
|---|---|---|---|
| 2,413,553 | 12/1946 | Evers | 83/152 X |
| 2,729,042 | 1/1956 | Brook | 53/389 |
| 2,894,363 | 7/1959 | Voogd | 53/389 X |
| 2,982,077 | 5/1961 | Smith | 53/389 |
| 3,438,625 | 4/1969 | Ramsey et al. | 83/94 X |
| 3,477,323 | 11/1969 | Osborn | 83/94 X |

Primary Examiner—Frank T. Yost
Attorney—Koenig, Senniger, Powers & Leavitt

[57] ABSTRACT

Apparatus in which a web of flexible sheet material, e.g., paper or plastic film, is unwound from a roll, and segmented into individual sheets, each sheet, as it is segmented from the web, being fed forward and accurately stopped in a working position in another apparatus such as a wrapping machine in which the sheet is caused to become wrapped around an article or articles. The cut-off sheet is fed forward by an endless belt conveyor arrangement and accurately stopped in the working position by a vacuum stop, with provision for fine adjustment of the working position of the sheet even while the apparatus is in operation.

15 Claims, 8 Drawing Figures

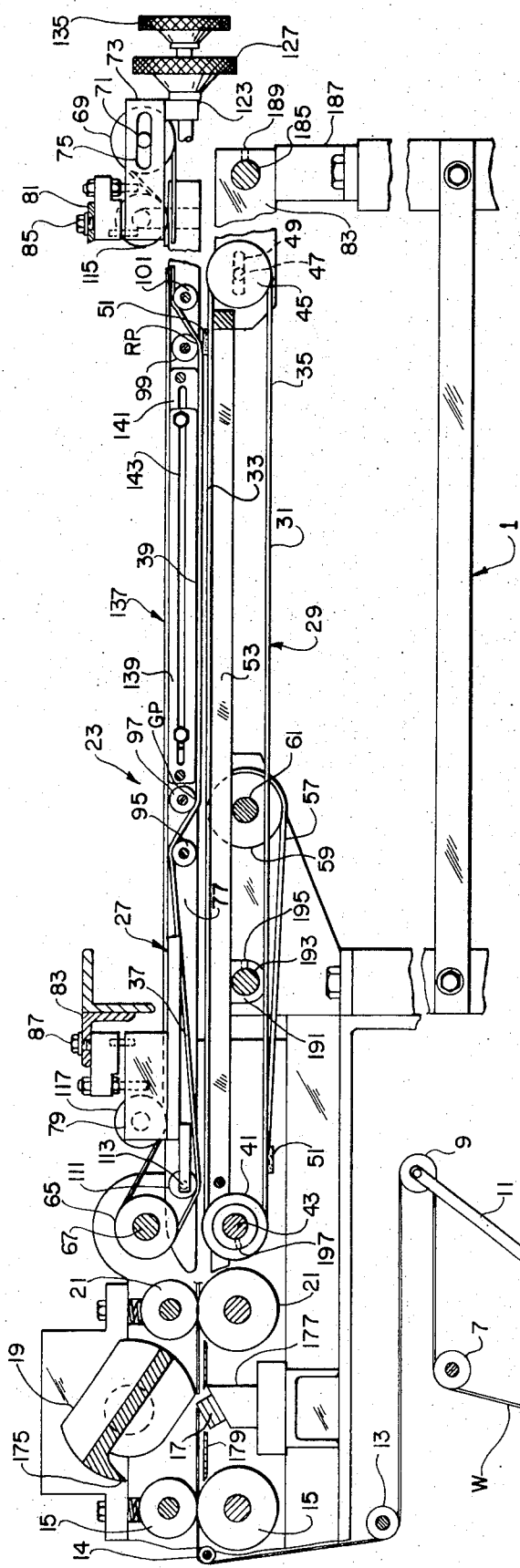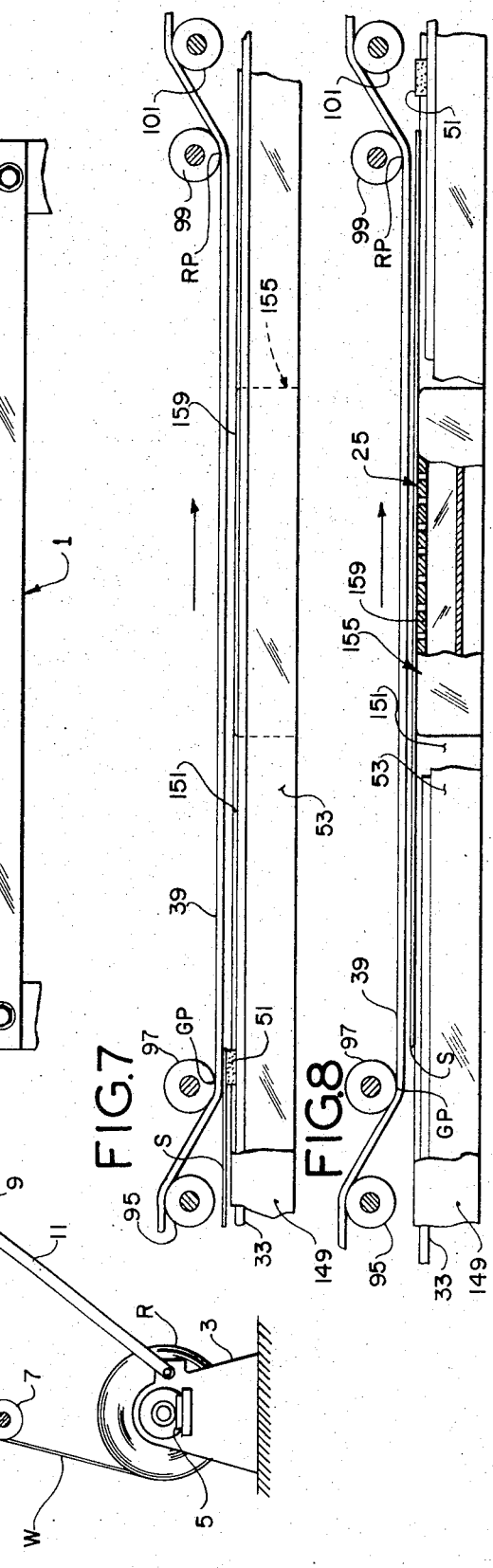

APPARATUS FOR CUTTING A WEB INTO SHEETS AND POSITIONING THE SHEETS

BACKGROUND OF THE INVENTION

This invention relates to apparatus for cutting a web of flexible sheet material into individual sheets and feeding each sheet to a working position, and more particularly to apparatus of this class for segmenting individual sheets from a web of paper or plastic film, such as cellophane, or limp films such as that sold under the trademark SARAN by The Dow Chemical Company, or polyethylene, and feeding each sheet into position within a wrapping machine wherein the sheet is caused to become wrapped around an article or articles.

This invention is in the same field as the apparatus shown in U.S. Pat. No. 3,355,166. Various problems have been encountered in this field, including increasing the feed rate of the web material, the handling of various web materials including limp plastic films, precision location of the cut-off sheets in working position, and adjustability for various lengths of the sheets and web widths.

SUMMARY OF THE INVENTION

The objects of this invention are to solve the problems above-mentioned, with the provision of apparatus which is of relatively uncomplicated construction, easy to maintain, and which does not require any more than normal maintenance, which is capable of fine adjustment for accurate positioning of the sheets during high speed operation and which is readily adjustable to accommodate various lengths and widths of web material. In general, the invention involves the provision of movable means for mechanically gripping each sheet cut off from the web at its leading edge (as distinguished from the vacuum belt feed of U.S. Pat. No. 3,355,166 which engages the sides of the sheet), and pulling it forward in a predetermined path, and for releasing the sheet at a predetermined point along said path, and stationary means for gripping the sheet for stopping it at said predetermined point upon its release.

Other objects and features will be in part apparent and in part pointed out hereinafter.

BRIEF DESCRIPTION OF THE DRAWINGS

FIG. 2 is a vertical longitudinal section on line 2—2 of FIG. 1;

FIG. 7 is an enlarged vertical section on line 7—7 of FIG. 1 showing means for mechanically gripping the leading edge of the sheet and pulling it forward; and FIG. 8 is a view like FIG. 7 showing the sheet upon its release from the gripping means.

Corresponding reference characters indicate corresponding parts throughout the several views of the drawings.

DESCRIPTION OF THE PREFERRED EMBODIMENT

Figure 1:
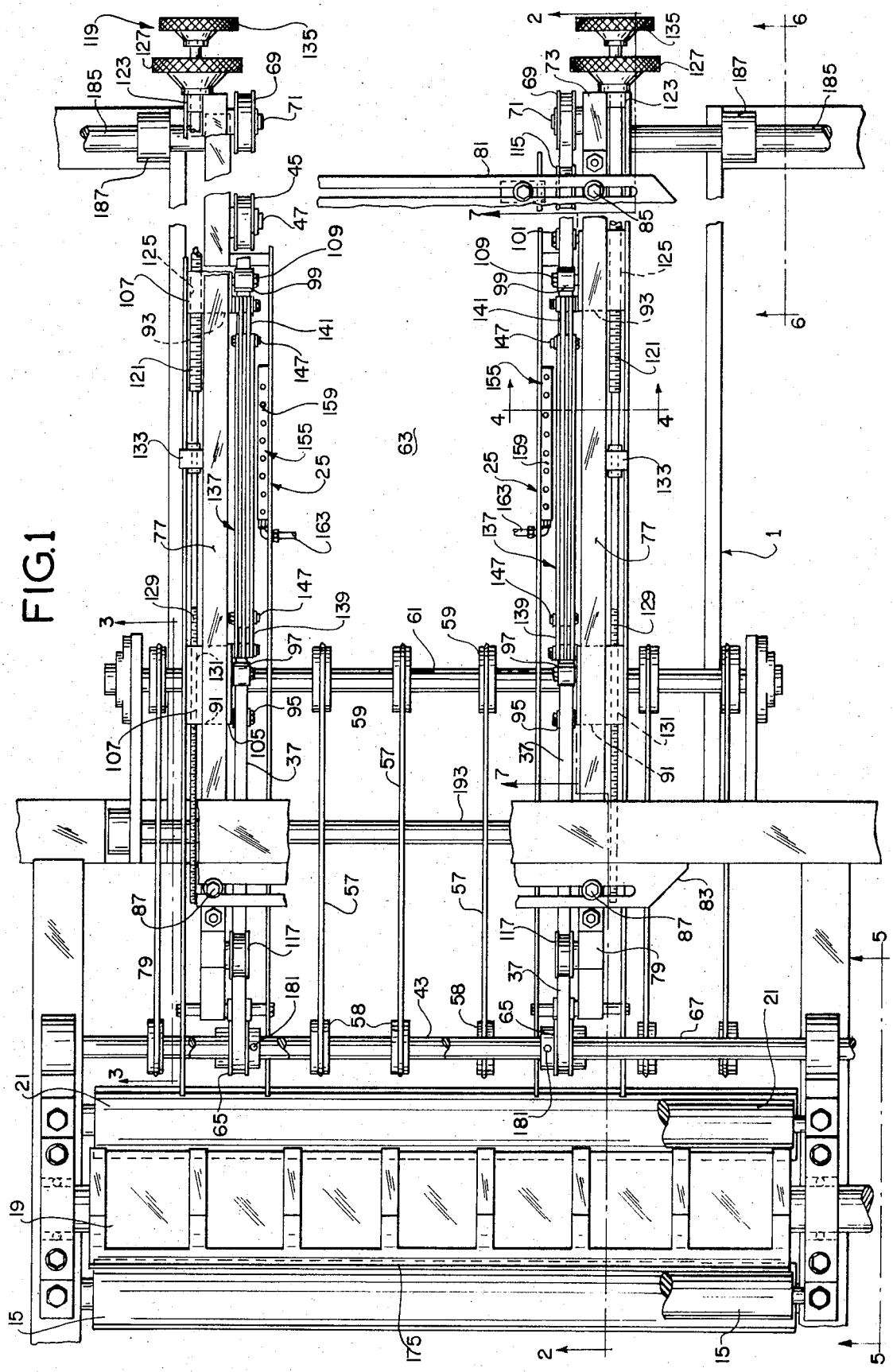
FIG. 1 is a plan view of a machine made in accordance with this invention, with parts broken away to reduce the length of the view.

Referring to the drawings, apparatus of this invention is shown to comprise a frame generally designated 1 having a roll stand 3 for holding a roll R of web material W (e.g., paper or plastic film) to be segmented into individual sheets S for use as wrappers for articles, the roll stand being mounted at one end of the apparatus, which may be referred to as its rearward or entrance end. This stand may be equipped with a suitable conventional braking device 5 for web tensioning purposes. As shown in FIG. 2, the web W, unwinding from the roll R, is trained over a guide roller 7, around a dancer roller 9 pivotally supported on arms 11 and around guide rollers 13 and 14 to be continuously fed into the apparatus at its rearward or entrance end. The web W passes from guide roll 14 horizontally between a pair of web feed rolls 15 for continuously feeding the web forward at a predetermined feed rate, and thence between a stationary shear blade 17 and a rotary knife 19 constituting means operable to cut the web on transverse lines spaced at sheet length intervals, thereby intermittently cutting off a sheet S at the leading end of the web. The web, prior to the segmenting of the sheet therefrom, and the sheet, after it has been segmented from the web, extends between a second pair of feed rolls 21.

Means generally designated 23 is provided for mechanically gripping each sheet S segmented from the web and extending forward from feed rolls 21, for pulling it forward in a predetermined path, and for releasing the sheet at a predetermined release point indicated at RP along said path correlated with a desired working position for the sheet. When the sheet is released, it is immediately brought to a stop by a vacuum gripping means indicated generally at 25.

Figure 4:
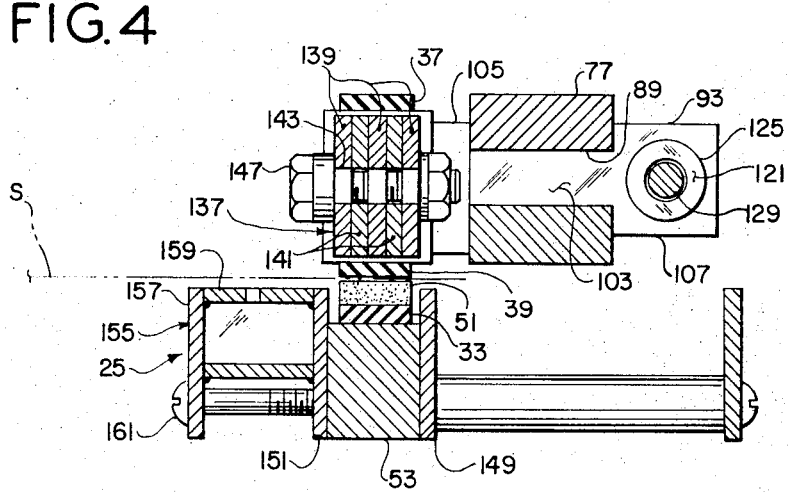
FIG. 4 is a partial vertical section on line 4—4 of FIG. 1.

More particularly, the means 23 for mechanically gripping a sheet and pulling it forward comprises an upper endless belt means generally designated 27 and a lower endless belt means generally designated 29. The lower belt means comprises a pair of laterally spaced endless belts 31 each having a forwardly moving horizontal upper reach 33 and a lower return reach 35, and the upper belt means 27 comprises a pair of similarly laterally spaced endless belts 37 each having a forwardly moving horizontal lower reach 39 opposed to the upper reach 33 of a respective lower belt 31. Both the upper belt and the lower belt means are driven at a speed substantially greater than the feed rate of web W. The two lower belts are located on opposite sides of the longitudinal center line of the machine trained around pulleys 41 on a rear pulley shaft 43 and pulleys 45 each on a forward pulley shaft 47, the latter being adjustable as indicated at 49 for belt tensioning purposes. Each of the two lower belts has sheet grippers constituted by pads 51 spaced at equal intervals around its length. As herein illustrated, there are two such pads on each of the belts, spaced from one another half the total length of the belt, which is a distance greater than the maximum length of sheet to be cut. Each belt may be eighty inches long, for example, and the two pads in such case are spaced forty inches apart. As shown in FIG. 4, the upper reaches 33 of the lower belts travel over and are backed up by bars 53. Auxiliary sheet-supporting belts 57 are provided at the rearward (entrance) end of the lower belt means, each of these auxiliary lower belts being trained around a pulley 58 (as shown in FIG. 1) on the rearward shaft 43, and a pulley 59 on an idler shaft 61 spaced forward of the rearward shaft 43 about four-ninths the distance from shaft 43 to shaft 47. The main belts 31 and 37 thus extend forward beyond idler shaft 61 and have a substantial space indicated at 63 between them over which sheet S is stopped in its working position. This space accommodates the upward movement between the belts 31, 37 on one side and 31, 37 on the other side of an article or articles to be wrapped on an elevator (not shown) of a wrapping machine.

The two upper belts 37 are located in the vertical planes of the lower belts 31. Each of the two upper belts is trained around a rear pulley 65 on a rear pulley shaft 67 located generally directly above the rear pulley shaft 43 for the lower belts and a forward pulley 69 on a stub shaft 71 carried by a block 73, the shaft being adjustable in a slot 75 in the block for belt tensioning purposes. Two guide bars each designated 77 extend horizontally longitudinally of the apparatus in vertical planes located adjacent but outside of the vertical planes of the lower belts and somewhat above the horizontal plane of the upper reaches 33 of the lower belts 31. The blocks 73 are secured on these bars at their forward ends. A block 79 is secured on each bar at its rearward end. Bars 77 are held in place by means of blocks 73 and 79 being fastened to crossbars 81 and 83, respectively, of the frame as indicated at 85 and 87 with provision for vertical and lateral adjustment of the bars. The bars 77 extend from a point somewhat rearward of the shaft 67 to a point well forward of the shaft 47.

Figure 6:
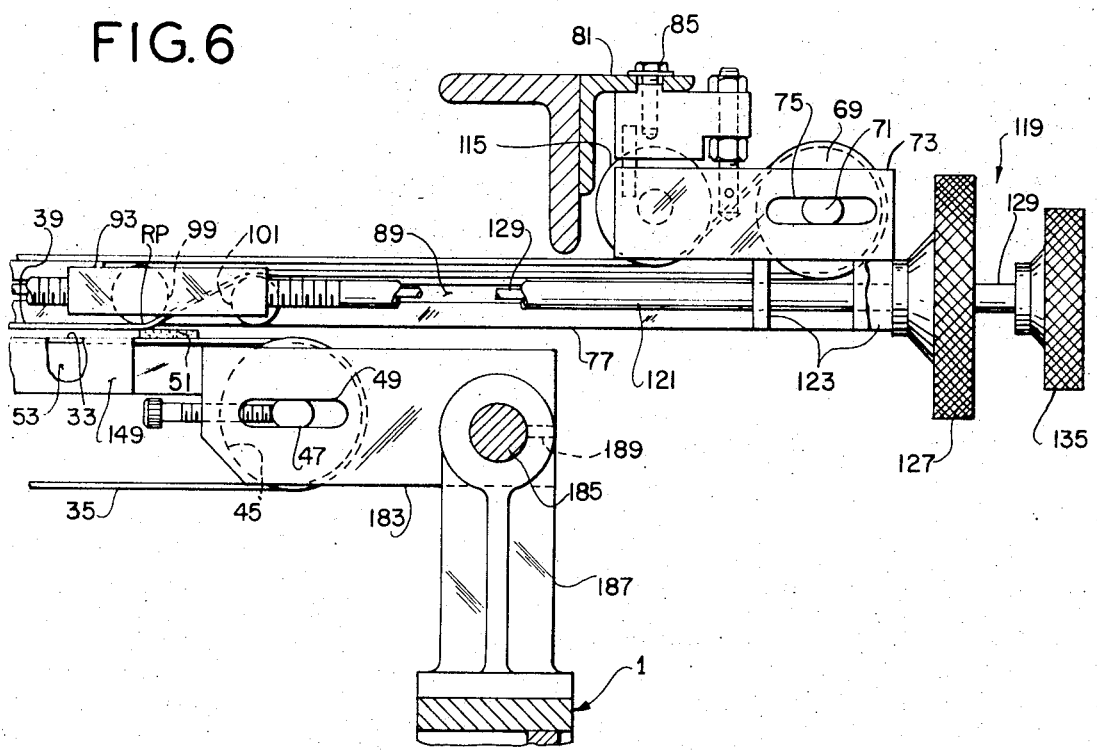
FIG. 6 is an enlarged partial vertical section on line 6—6 of FIG. 1.
Figure 3:
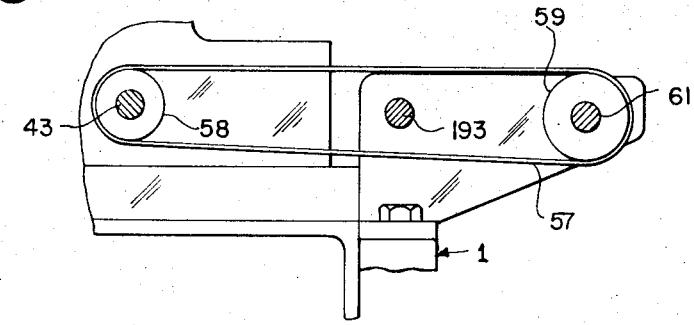
FIG. 3 is a partial vertical section on line 3—3 of FIG. 1.

Referring to FIG. 6, each guide bar 77 has an elongate horizontal slot 89 therein. Two slides 91 and 93 are slidable longitudinally of the apparatus in the slot of each bar 77. As shown in FIG. 1, the two slides 91 (at the left and right of the apparatus) are located at the rear of space 63 above shaft 61, and the two slides 93 (at the left and right of the apparatus) are located adjacent but rearward of shaft 47. Each rearward slide 91 carries a rearward pulley 95 and a forward pulley 97. Each forward slide 93 carries a rearward pulley 99 and a forward pulley 101. Each slide has a web 103 slidable in a respective slot 89, and inside and outside heads 105 and 107 slidable against the inside and outside faces of the respective bar 77. The pulleys are journalled on screws such as indicated at 109 threaded in tapped holes in the inside heads 105.

Each of the two upper belts 37 has its lower reach 39 extending forward from the rearward pulley 65 and inclined downward to travel under a pulley 111 journalled on a stub shaft 113 extending laterally inward from a rearward extension of bar 77. It passes underneath pulley 111 spaced above the respective lower belt 31 a distance somewhat greater than the height (thickness) of the pads 51. Thence, it travels forward and upward on a slight incline over the top of the rearward pulley 95 on the rearward slide 91 thence forward and downward on a steeper incline under and around the bottom of the forward pulley 97 on the rearward slide 91, thence horizontally in its aforesaid horizontal lower reach 39 under the rearward pulley 99 on the forward slide 93, thence forward and upward on an incline over and around the top of the forward pulley 101 on the forward slide, thence forward and horizontally under the pulley 69 on block 73, thence back around pulley 69 and rearward and downward on an incline under a pulley 115 carried by block 73 rearward of pulley 69, thence horizontally in a relatively long horizontal return reach under a pulley 117 carried by the block 79, and thence rearward and upward on an incline over the top and around pulley 65 back to its lower reach. Between pulleys 97 and 99, the bottom faces of the belts 37, in their horizontal lower reaches 39, are spaced above the upper reach 33 of the belts 31 a distance slightly less than the height (thickness) of the pads 51.

The above-described arrangement is such that a sheet S cut off by the knife 19 and fed forward by the second feed roll 21 (and by the rear portions of the horizontal upper reaches of lower belts 31 and auxiliary belts 57) becomes gripped at its leading edge between one of the pads 51 on each of the two belts 31 and the lower horizontal working reaches 39 of the upper belts 37 as the pads pass under pulleys 97 (the lower belts being appropriately phased with the knife 19 for this purpose), and is accordingly pulled forward as far as the rearward pulleys 99 of the forward slides 93, at which point the grip on the leading edge of the sheet is released by reason of the divergence of the upper belts away from the upper horizontal reaches 33 (and the pads 51) of the lower belts. Thus, the pulleys 97 constitute an initial grip point, indicated at GP, and the pulleys 99 constitute the release point RP.

Means indicated generally at 119 is provided for adjusting the slides 91 associated with each of the two bars 77 to move the pulleys 95 and 97 to vary the point at which the pads 51 first grip the sheet S for pulling it forward (i.e., the initial gripping point GP), and for adjusting the slides 93 to move the pulleys 99 and 101 to vary the point at which the sheet is released by reason of the divergence of the upper belts away from the pads (the release point RP). As shown in FIGS. 1 and 6, this means comprises an elongate tubular screw 121 journalled for rotation on a horizontal axis extending longitudinally of the apparatus adjacent and on the outside of the respective guide bar 77 in bearing members 123 on the outside of bar 77 at its forward end. The tubular screw extends through and is threaded in a tapped hole 125 in the outside head 107 of the slide 93 from end-to-end thereof. The tubular screw has a knob 127 on its outer (forward) end for turning it, the arrangement being such on turning the tubular screw in one direction, the slide 93 is moved rearward, and on turning it in the other direction, the slide is moved forward. Each of the rearward slides 91 is longitudinally adjustable by an elongate adjusting screw 129 extending through a respective tubular screw 121 and rotatable therein, and extending through and threaded in a tapped hole 131 reaching through the outside head of slide 91 from end-to-end thereof. Each inner screw 129 is journalled intermediate its ends in a block 133 and has a knob 135 on its outer (forward) end for turning it, the arrangement being such that on turning screw 129 in one direction, the respective slide 91 is moved rearward, and on turning it in the other direction, the slide 91 is moved forward. It will be observed that moving the rearward slides 91 varies the point GP where pads 51 first grip a sheet S against the upper belts 37 and that moving the forward slides 93 varies the point RP where the sheet is released.

Means indicated generally at 137 is provided for backing the horizontal lower working reach 39 of each of the upper belts 37 while permitting the abovenoted adjustment of the slides. As shown best in FIGS. 1 and 4, this means comprises a set of vertically disposed spaced parallel slats 139 extending forward from the rearward slide 91 toward the forward slide 93 above the horizontal reach 33 of the belts 31, and a set of vertically disposed spaced parallel slats 141 extending rearward from the forward slide 93 interdigitated with the slats 139, so as to provide an extensible and contractible back-up bar for the belt reach 39. The slats 139 and 141 have elongate horizontal slots 143 therein for the passage of bolts 147 for holding the slats in assembly. A rail 149 is provided on the outside of the upper reach 33 of each lower belt 31, and a rail 151 is provided on the inside of the upper reach of each lower belt, each of these rails consisting of a flat bar arranged vertically with its upper edge slightly above the top surface of the upper reach 33 of the lower belt to support a sheet S above and out of contact with reach 33 (see FIG. 4). These rails are applied to the sides of the back-up bar 53 for reach 33, extending forward from adjacent the front feed roller 21 to the front end of bars 53.

The means 25 for gripping the sheet S upon its release at RP (i.e., at pulley 99 on front slide 93) comprises a pair of vacuum grippers at opposite sides of the apparatus each generally designated 155. Each of these vacuum grippers comprises an elongate narrow box 157 having a perforated top 159 located adjacent the inner edges of the upper reaches 33 of lower belts 31. The vacuum box is secured to the inside portion of rail 151 by screws 161 with the perforated top 159 of the box at the level of the top edge of rail 151. The vacuum grippers are connected to a vacuum source (not shown) by flexible lines 163.

Figure 5:
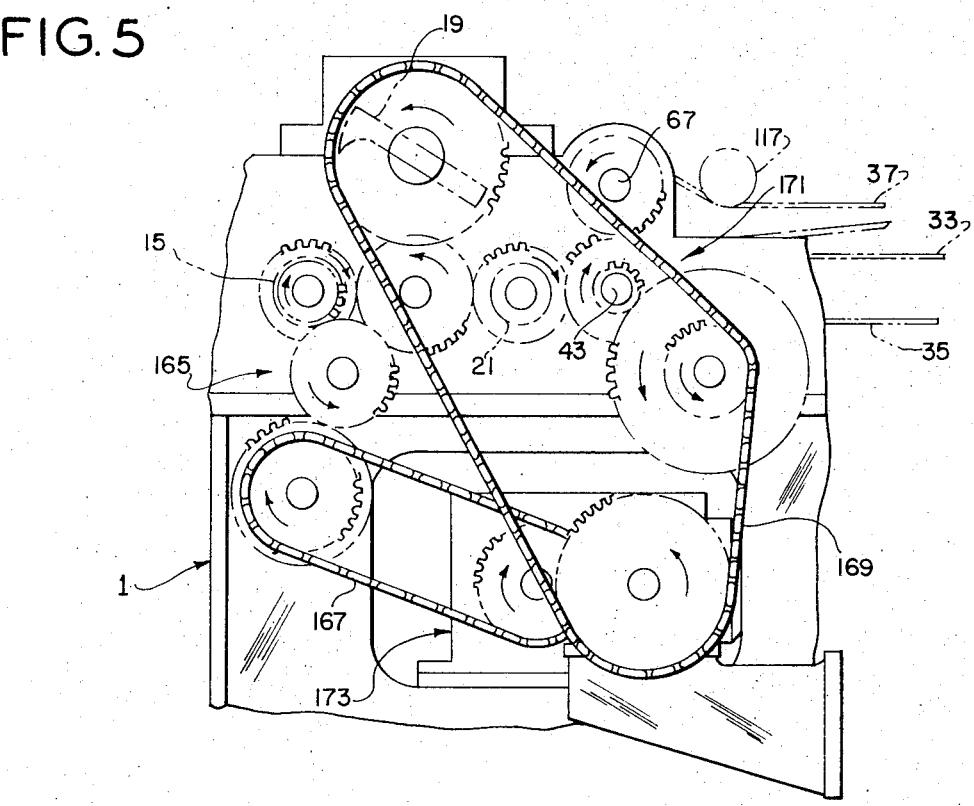
FIG. 5 is a partial vertical section on line 5—5 of FIG. 1.

Referring to FIG 5, the entrance feed rolls 15 and the exit feed rolls 21 are shown to be continuously driven at a constant speed via a gear train, generally indicated at 165, and a drive chain 167. The rotary knife 19 and the shafts 43 and 67, which drive the belts 31, 37 and 57, are also continuously driven, but at a higher surface speed than the feed rolls, by a second drive chain 169 and by a second gear train, generally indicated at 171, independent of the feed roll gear train. Both drive chains are continuously driven by different output shafts of a motor-speed reducer unit 173. Thus, the web W is continuously fed past the rotary knife and onto the belts, and the belts are continuously moving to place a sheet S over the opening 63.

The rotary knife 19 has a cutting edge 175 for cutting the web W into sheets S by shearing off the web against the shear blade 17. The latter is mounted on a resilient base 177 secured to the frame 1. Supports such as indicated at 179 are provided between rolls 15 and blade 17 and between blade 17 and rolls 21 to hold up the web W and sheets S. The rolls 15 feed the web W at a constant speed to the knife 19 for cutting it into sheets S. Rolls 21 feed each cut-off sheet S forward at the same speed as the web (and lower than the speed of the belts). When the leading edge of the cut-off sheet S is gripped between belts 37 and pads 51 on belts 31, the sheet is accelerated up to the speed of the belts and thus separated at its trailing end from the leading end of the web. It is contemplated that the knife 19 may be replaced by means for forming a line of perforations across the web, and feed rolls 21 eliminated, so that when the leading edge of the web is gripped by the pads, the sheet S will be torn off at the line of perforations.

In addition to being readily adjustable for accurate positioning of the sheets S as heretofore described, apparatus of this invention is readily adjustable to accommodate various widths of webs W. In order to accurately place sheets of different widths, the upper belts 37 and the lower belts 31 on each side of opening 63 are horizontally moved toward or away from the corresponding belts on the other side of the opening. The upper belts 37 may be horizontally moved toward or away from each other by backing off set screws 181 in the hubs of each pulley 65, and loosening bolts 85 and 87 so that bars 77 may be horizontally moved transversely of the apparatus. When the upper belts are in their desired positions, the set screws 181 may be tightened to fix the pulleys 65 on shaft 67 and bolts 85 and 87 may be tightened to secure bars 77 to the frame 1. As each bar 77 is horizontally moved, all the parts heretofore described associated with the upper belt are moved therewith. Thus, it is a relatively simple procedure to vary the horizontal spacing between the upper belts.

Like the upper belts 37, the lower belts 31 are adapted to be readily moved toward or away from each other to accommodate various widths of webs W. The front pulleys 45 are each carried by a block 183 which is slidably mounted on a horizontal rod 185 which in turn is secured to frame 1 by a pedestal 187. A set screw 189 in each block releasably secures the block on the rod. By backing off set screw 189, the blocks 183 and the front pulleys 45 may be horizontally moved transversely of the apparatus. The rear portion of back-up bar 53 is carried by a fitting 191 which is slidable on a rod 193 extending transversely of the apparatus forward of shaft 43. Fitting 191 is releasably secured to rod 193 by a set screw 195. To move the rear portions of the lower belt, the set screws 197 holding pulleys 41 on shaft 43 and the set screws 195 holding fittings 191 on rod 193 must be backed off to permit the back end of the lower belt and bar 53 to be moved transversely of the apparatus. If it is desired to move the lower belts toward each other more than the spacing between pulley 41 and the adjacent pulleys 58 carrying auxiliary belts 57, the set screws (not shown) holding pulleys 58 on shaft 43 and the set screws holding pulleys 59 on shaft 61 must be backed off so the auxiliary belts can be horizontally moved to be closer together on their shafts 43 and 61 to permit the lower belts 31 to be moved the desired distance.

In operation, apparatus of this invention operates continuously to cut off sheets S from a web W of limp film and to accurately place these sheets over the opening 63 to be wrapped about an article by other apparatus not herein shown. With the apparatus set up as shown in FIG. 2, the web W is continuously fed forward by feed rolls 15 over the stationary shear blade 17, between the front feed rolls 21 and onto the upper reaches of lower belts 31 and auxiliary belts 57. The forward speed of the lower belts and the auxiliary belts is substantially greater than the speed at which the web is fed forward by the feed rolls so that the web slips on these belts as it is fed forward by the forward feed rolls 21. The frictional force of the fast-moving belts on the web pulls the web forward substantially eliminating wrinkles in the web. The forward feed rolls 21 frictionally engage a sheet S which has been segmented from the web W and restrain the sheet from being pulled forward by the belt friction until the trailing edge of the sheet clears these feed rolls. The front pulley 97 on each rear slide 91 is located above the corresponding lower belt 31 so that a small gap, slightly less than the thickness of pad 51, is present between the bottom surface of the lower reach 39 of the upper belt and the top surface of the upper reach 33 of the lower belt. The position of each rear pulley 97 (i.e., the gripping point GP) may be adjusted along the length of the corresponding lower belt by turning a respective knob 135 to move each slide 91 in its slot 89 in bar 77 via screw 129. Each slide 91 is accurately positioned to locate pulley 97 thereon directly above the position reached by the leading edge of the sheet S at the instant the trailing edge of the sheet emerges from the feed rolls 21 (i.e., pulley 97 is spaced forward of the nip of the feed rolls 21 a distance equal to the length of sheet S). The rotary knife is timed relative to the feed rolls so that, when a length of web W corresponding to the desired length of sheet S has been fed past the stationary blade 17, the rotary knife will cut the web. The lower belt 31 is also timed relative to the feed rolls so that as the trailing edge of sheet S clears the feed rolls 21 and as the leading edge of the sheet is below pulleys 97, one of the gripper pads 51 on each of the lower belts will engage the leading edge of the sheet S at the gripping point GP and firmly hold the sheet between the pad and the lower reach 39 of the upper belt 37. Since the upper reach 33 of the lower belt 31 and the lower reach of the upper belt are driven in the same direction (toward the front of the apparatus), the sheet S will be fed forward at the speed of the upper and lower belts. As the sheet is fed forward, the trailing portions of the sheet are supported on the stationary rails 149 and 151 adjacent the upper reach of each lower belt.

The point at which the sheet S is stopped over the opening 63 may be accurately adjusted by moving the pulleys 99 carried on slides 93 along the length of the upper belts 37 to vary the point at which the lower reaches 39 of the upper belts are moved up and away from the upper reaches 33 of the lower belts (i.e., the release point RP). When the leading edge of the sheet S is no longer gripped between the pads 51 and the upper belts, the sheet may be readily stopped at a desired position because the sheet is supported above the lower belts on stationary rails 149 and 151 clear of the moving belts so that the only force to be overcome to stop the sheet is the inertia of the moving sheet. The position of the pulley 99 on each slide 93 (i.e., the release point RP) may be adjusted along the length of the corresponding lower belt by turning a respective knob 127 to move the slide in its slot 89 in bar 77 via screw 121. By turning the knobs 135 and 127 to adjust the slides 91 and 93, respectively, the point GP at which the leading edge of sheet S is gripped by the pads and the point RP at which the sheet is released from the pads may be adjusted even while the apparatus is operating to "fine tune" the apparatus to accurately place the sheets, and no changes of belt length or tensioning are required to effect these adjustments. Furthermore, the gripping points and the release points only depend on the position of pulleys 95 and 99 and complicated grippers or other mechanical means for positively holding the sheet are not required.

As previously stated, the only force that must be overcome to stop the forward movement of the sheet S once the sheet has been released from between the pads 51 and the upper belt is the inertia force of the sheet. Vacuum boxes 155 are provided to engage the side portions of the sheet to immediately bring the sheet to a stop upon its release. The vacuum boxes begin to exert a stopping force on the sheet as soon as the leading edge of the sheet passes over the perforated top 159. The pads, however, continue to pull the sheet forward over the vacuum boxes, thereby exerting a tensioning force on the sheet, until the sheet is released at RP. Thus, the sheet is kept free of wrinkles and the vacuum boxes act to stop the forward movement of the sheet the instant the sheet is released from the pads. The vacuum boxes also hold the sheet over the opening 63 in its working position until the sheet can be wrapped about an article.

As sheet S is moved forward over opening 63 by belts 31 and 37, the web W is continuously fed forward over the blade 17. Since the belts travel at a speed substantially higher than the speed at which the web W is fed by the feed rolls, a short interval of time will elapse between one sheet being placed over the opening 63 and the succeeding sheet being released from the rollers 21. During this interval, wrapping apparatus (not shown) is actuated to wrap an article in the sheet placed across opening 63, thereby clearing the opening for receiving another sheet. In operation, the speed at which the apparatus of this invention operates may be varied, and the apparatus is capable of placing approximately one hundred and twenty sheets S per minute over opening 63.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. Apparatus for segmenting a web of flexible sheet material into individual sheets and feeding each sheet to a working position comprising means for continuously feeding the web forward from a web supply, means operable intermittently to segment a sheet at the leading end of the web, and means for feeding forward each sheet so segmented from the web to a working position comprising means for mechanically gripping each sheet at its leading edge, pulling it forward in a predetermined path and releasing it at a predetermined release point along said path correlated with said working position of the sheet, and means for gripping the sheet for stopping it in said working position upon its release by said mechanical gripping means, wherein the gripping means for stopping the sheet is operable prior to the release of the mechanical gripping means to effect tensioning of the sheet and immediate stopping thereof upon the release of the sheet by said mechanical gripping means.

2. Apparatus as set forth in claim 1 wherein the gripping means for stopping the sheet is a stationary vacuum gripping means.

3. Apparatus for segmenting a web of flexible sheet material into individual sheets and feeding each sheet to a working position comprising means for continuously feeding the web forward from a web supply, means operable intermittently to segment a sheet at the leading end of the web, and means for feeding forward each sheet so segmented from the web to a working position comprising means for mechanically gripping each sheet at its leading edge, pulling it forward in a predetermined path and releasing it at a predetermined release point along said path correlated with said working position of the sheet, and means for gripping the sheet for stopping it in said working position upon its release by said mechanical gripping means, and having means for varying the point at which the mechanical gripping means is released.

4. Apparatus for segmenting a web of flexible sheet material into individual sheets and feeding each sheet to a working position comprising means for continuously feeding the web forward from a web supply, means operable intermittently to segment a sheet at the leading end of the web, and means for feeding forward each sheet so segmented from the web to a working position comprising means for mechanically gripping each sheet at its leading edge, pulling it forward in a predetermined path and releasing it at a predetermined release point along said path correlated with said working position of the sheet, and means for gripping the sheet for stopping it in said working position upon its release by said mechanical gripping means, wherein said movable mechanical gripping means comprises an upper and a lower endless belt means, the lower belt means comprising laterally spaced endless belts each having a forwardly moving upper reach, the upper belt means comprising similarly laterally spaced endless belts each having a forwardly moving lower reach opposed to the upper reach of the respective lower belt, each of the lower belts having sheet grippers thereon spaced at equal intervals around its periphery adapted in moving forward with the upper reaches of the lower belts to clamp the leading edge of each sheet against the lower reaches of the upper belts thereby to feed the sheet forward, the grippers and the lower reaches of the upper belts being divergent at said predetermined point to their path of travel to release the sheet.

5. Apparatus as set forth in claim 4 wherein the grippers are pads on the lower belts.

6. Apparatus as set forth in claim 5 having means backing the forwardly moving upper reaches of the lower belts and means backing the forwardly moving lower reaches of the upper belts.

7. Apparatus as set forth in claim 6 having means for supporting the sheet at a level above the forwardly moving upper reaches of said lower belts, said support means being located adjacent said lower belt backing means.

8. Apparatus as set forth in claim 4 wherein for the divergence of the grippers and the lower reaches of the upper belts the latter have guide means guiding them for travel up and away from the upper reaches of the lower belts at said predetermined release point.

9. Apparatus as set forth in claim 8 wherein said guide means is adjustable longitudinally of the apparatus to vary the location of said predetermined release point.

10. Apparatus as set forth in claim 4 having guide means for guiding the upper belts downwardly toward the upper reaches of the lower belts for gripping of a sheet by the grippers on the lower belts at a predetermined grip point in their path of travel.

11. Apparatus as set forth in claim 10 wherein said guide means is adjustable longitudinally of the apparatus to vary the location of said predetermined grip point.

12. Apparatus as set forth in claim 11 wherein for the divergence of the grippers and the lower reaches of the upper belts the latter have guide means guiding them for travel up and away from the upper reaches of the lower belts at said predetermined release point.

13. Apparatus as set forth in claim 12 wherein the guide means for guiding the upper belts up and away is adjustable longitudinally of the apparatus to vary the location of said predetermined release point.

14. Apparatus as set forth in claim 13 having extensible and contractible back-up means for the lower horizontal working reaches of the upper belts extending between the adjustable guide means.

15. Apparatus as set forth in claim 11, wherein the web is continuously fed forward at a predetermined speed, and having means operable to cut the web on transverse lines at sheet length intervals intermittently to segment a sheet at the leading end of the web, feed rolls located forward of said web cutting means for feeding each sheet forward at said predetermined speed over said lower belts toward said gripping point, the latter being located forward of said feed rolls a distance corresponding to the length of said sheet so that as the leading edge of said sheet reaches said gripping point, the trailing edge of said sheet is fed clear of said feed rolls.

* * * * *